Figure 1:
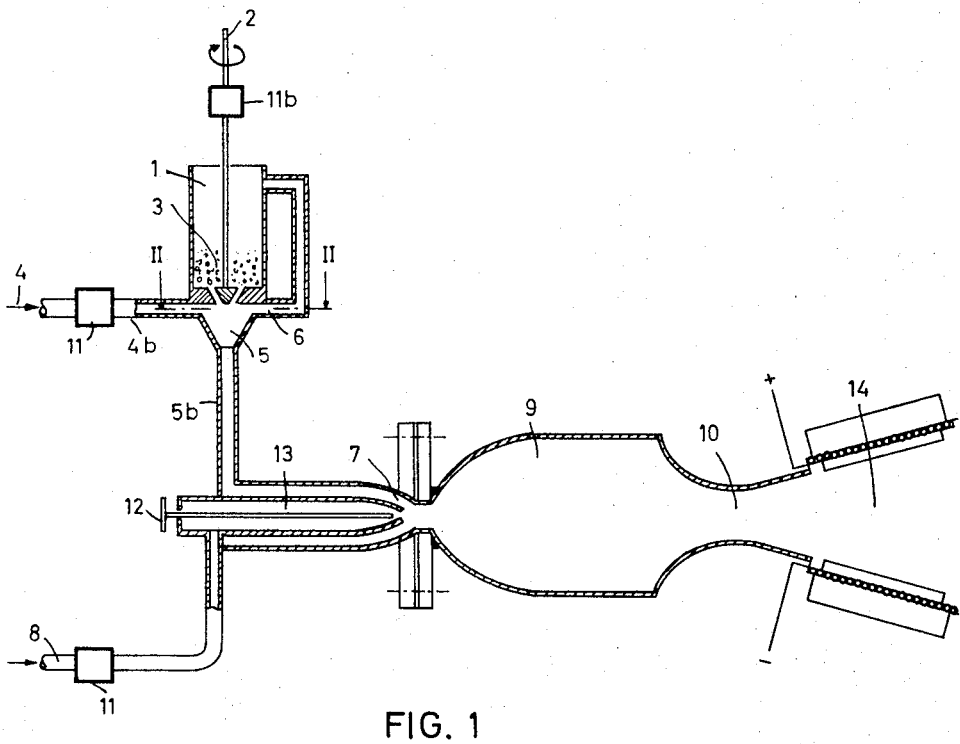

United States Patent Office 3,359,436
Patented Dec. 19, 1967

3,359,436
SEEDING DEVICE FOR A MAGNETOHYDRO-
DYNAMIC GENERATOR
Hans Kohaut, Bamberg, and Hermann Wittel, Erlangen, Germany, assignors to Siemens-Schuckertwerke Aktiengesellschaft, Berlin-Siemensstadt, Germany, a corporation of Germany
Filed Jan. 17, 1964, Ser. No. 338,344
Claims priority, application Germany, Feb. 2, 1963,
S 83,565
6 Claims. (Cl. 310—11)

Our invention relates to seeding devices and more particularly to a device that supplies seeding material to the plasma of a magnetohydrodynamic generator.

It is generally known that in magnetohydrodynamic generators, hereinafter referred to as MHD generators, electrical energy can be obtained from a thermally produced rapidly flowing plasma through which an external homogeneous field passes transversely. The plasma must run in opposition to the external magnetic field through the magnetic field of the removable electrical current which is perpendicular to the plasma current and to the external magnetic field. The high gas speeds that are necessary for operation are obtained by expansion of the plasma. In order to effect sufficiently high conductivity of the plasma and to maintain the same after expansion thereof, slightly ionizing material, so-called seeding material, is added to the working gas. Atoms of elements in the alkali column of the periodic table are particularly suitable for this purpose.

In previously known methods of so-called MHD generator open systems, seeding material is distributed in fluid form into the burner chamber or into the gas stream. Potassium or potassium soap has been used for example for this purpose. In other known methods seeding material in powder form is carried as a suspension in the plasma-producing fuel. In all of these known methods there is incomplete distribution of the seeding material due to the high viscosity of the seeding material or of the carrier material and a heterogeneous plasma is consequently formed. Furthermore, due to the suspension of the seeding material in the plasma fuel, temporary stoppages of the conduits of the flow-quantity meters often occur, leading to fluctuations in pressure which cause great difficulty in measuring the throughput quantity and consequently prevent proper regulation thereof. In order to reduce the aforementioned disadvantages, the seeding materials are even injected at high temperature; however, technical difficulties arise in the process and great expense is necessary to overcome these difficulties.

It is accordingly an object of our invention to provide an apparatus for supplying seeding material in solid form to the combustion atmosphere of MHD generators, without the aforedescribed disadvantages.

With the above and other related objects in view, we provide as a feature of our invention, a metering device to which is connected a vortex funnel through which air flows for intimately mixing air and powdered seeding material. It is expedient that the metering device include a grinding or pulverizing mill with an adjustable speed. A vortex is advantageously produced in the funnel-shaped structure of the metering device by blowing the air tangentially into the funnel. Pressure equalization with the seeding material supply container must be provided. Air enriched with oxygen or pure oxygen can be used as carrier gas.

In the so-called half-open MHD generator system, the gases that are burned are permitted to escape just as in the open system, however, the seeding material, at least in part, can be recovered and advantageously reintroduced into the system in accordance with the arrangement of our invention. The conductivity of the plasma can be controlled by the measured addition of seeding material to the air or oxygen stream within a feasible operating range, arbitrarily and independently of other parameters. Examples of such parameters are gas pressure and gas velocity. The air or oxygen stream together with the fuel, such as diesel oil for example, is advantageously fed through a circular nozzle for combustion. The mouth piece of the circular nozzle can be provided with twisted guiding ribs for causing a vortex of the mixed fuel and air stream.

Figure 2:
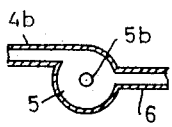

Other features which are considered as characteristic for the invention are set forth in the appended claims. The invention together with additional objects and advantages thereof will be best understood from the following description when read in conjunction with the accompanying drawing, in which:

FIG. 1 diagrammatically shows a metering device including a grinding mill embodying our invention; and FIG. 2 is a sectional view of the vortex funnel taken along the line II—II in FIG. 1 in the direction of the arrows as shown.

Referring to the schematically represented drawings and first particularly to FIG. 1 there is shown a pulverizer or grinding mill 1 adjustably driven by the shaft 2 which is connected to a source of rotary power (not shown) and which accordingly supplies a measurable amount of pulverized seeding material 3, for example 150 grams of potassium carbonate per minute. Finely divided seeding material is delivered by the main air or oxygen stream 4 through a conduit 4b with, for example, a throughput of 1.5 Nm.$^3$/min. into a vortex funnel 5 of the grinding mill. The most favorable grain size of the seeding material is in the order of magnitude of 10 microns or finer. Pressure equalization between the interior of the grinding mill 1 and the vortex funnel 5 is effected by the conduit 6. The oxygen stream is then conveyed through a conduit 5b from the funnel 5 to a circular burner nozzle 7 at an absolute pressure of 5 to 6 atmospheres as compared to a one atmosphere absolute pressure in a burner chamber 13 located behind the outlet end of the nozzle 7. This circular nozzle, whose outlet end can be provided with twisted guiding ribs, is connected with another conduit 8 for conveying thereto and into the burner chamber 13 combustible material such as diesel oil at 1.2 to 1.3 atmospheres absolute pressure for example. Ignition of the combustible mixture can take place in a number of different ways of which the following are examples: The oxidizing gas or the fuel or both can be preheated to a temperature that will cause spontaneous ignition when mixing occurs. The mixture can be ignited by an electric arc across a pair of energized electrodes (not shown) located at the nozzle outlet. Ignition can also be effected by surrounding the nozzle outlet with a suitably energized high frequency induction coil (not shown) which will increase the temperature of the mixture to the appropriate kindling temperature. Combustion then goes to completion in the combustion chamber 9, lying downstream of the nozzle, generating an injected plasma with homogeneously distributed seeding material, which subsequently expands through the nozzle 10 into a magnetohydrodynamic generator 14 shown schematically in FIG. 1 and similar for example to the MHD generator diagrammatically illustrated on page 62 of the November 1959 issue of the periodical Power. A known pressure regulating device 11 is provided in the line 8 for adjusting the pressure of the combustion fuel to the burner chamber 13 and a needle valve 12 in the burner chamber provides additional fine regulation of the fuel feed into the air stream of the nozzle 7. A suitable device 11b for regulating the rotary speed of the shaft 2 of the grinding mill 1 is also provided.

FIG. 2 shows the vortex funnel in cross section along the line II—II of FIG. 1. The formation of the vortex or whirl is maintained in the funnel by introducing the air or oxygen stream from the conduit 4b tangentially to the funnel as shown in FIG. 2. A good homogeneous plasma can thus be provided with an apparatus constructed in accordance with our invention at relatively little cost. As a matter of fact, if the seeding material is already provided in powder form, a metering apparatus can merely be employed instead of a grinding mill, thus even further reducing the cost of the apparatus.

While the invention has been illustrated and described as embodied in a particular apparatus for feeding or supplying seeding material in a magnetohydrodynamic generator, it is not intended to be limited to the details shown, since various modifications and structural changes may be made without departing from the spirit of the present invention and within the scope and range of equivalents of the following claims.

We claim:

1. In a plasma-seeding apparatus, a vortex funnel; metering means communicating with said funnel for supplying a metered quantity of pulverulent ionizing seeding material into said funnel; and means for supplying a gas stream into said funnel so that the ionizing seeding material is whirled about by the gas stream and is intimately mixed with the gas in said vortex funnel, said funnel communicating with a supply of fuel combustible in said gas stream to form a plasma having increased electrical conductivity due to the presence of said ionizing seeding material therein.

2. In a plasma-seeding apparatus, a vortex funnel; metering means communicating with said funnel for supplying a metered quantity of pulverulent ionizing seeding material into said funnel; and means for supplying an oxidizing gas stream into said funnel so that the ionizing seeding material is whirled about by the oxidizing gas stream and is intimately mixed with the oxidizing gas in said vortex funnel, said funnel communicating with a supply of fuel combustible in said gas stream to form a plasma having increased electrical conductivity due to the presence of said ionizing seeding material therein.

3. In a plasma-seeding apparatus, a vortex funnel; metering means comprising a pulverizing mill operable at an adjustable speed, said mill communicating with said funnel for supplying a metered quantity of pulverulent ionizing seeding material into said funnel; and means for supplying an oxidizing gas stream into said funnel so that the ionizing seeding material is whirled about by the oxidizing gas stream and is intimately mixed with the oxidizing gas in said vortex funnel, said funnel communicating with a supply of fuel combustible in said gas stream to form a plasma having increased electrical conductivity due to the presence of said ionizing seeding material therein.

4. A seeded plasma generating apparatus for magnetohydrodynamic generators, comprising a vortex funnel; metering means communicating with said funnel for supplying a metered quantity of pulverulent ionizing seeding material into said funnel; means for supplying an oxidizing gas stream into said funnel so that the ionizing seeding material is whirled about in said vortex funnel by the oxidizing gas stream and is intimately mixed with the oxidizing gas; fuel supply means; and means for burning the fuel supplied by said fuel supply means in the stream of oxidizing gas intermixed with the ionized seeding material so as to generate a seeded plasma having increased electrical conductivity due to the presence of the ionizing seeding material therein.

5. A magnetohydrodynamic generator assembly, comprising a magnetohydrodynamic generator and apparatus for supplying seeded plasma at high speed to said generator, said apparatus comprising a vortex funnel; metering means including a pulverizing mill operable at an adjustable speed, said mill communicating with said funnel for supplying a metered quantity of pulverulent seeding material into said funnel; means for supplying an oxidizing gas stream into said funnel so that the seeding material is whirled about by the gas stream and is intimately mixed with the oxidizing gas in said vortex funnel; burner nozzle means for receiving seeded oxidizing gas from said funnel; fuel supply means for supplying fuel to said burner nozzle means so that a combustible mixture of the fuel and seeded oxidizing gas is formed in said nozzle means; combustion chamber means for receiving seeded plasma formed by combustion of the combustible mixture issuing from said burner nozzle means, said combustion chamber means being provided with an expansion nozzle in which the seeded plasma is expanded and directed at high speed to said magnetohydrodynamic generator.

6. A magnetohydrodynamic generator assembly, comprising a magnetohydrodynamic generator and apparatus for supplying seeded plasma at high speed to said generator, said apparatus comprising a vortex funnel; metering means communicating with said funnel for supplying a metered quantity of pulverulent seeding material into said funnel; means for supplying an oxidizing gas stream into said funnel so that the seeding material is whirled about by the gas stream and is intimately mixed with the oxidizing gas in said vortex funnel; burner nozzle means for receiving seeded oxidizing gas from said funnel; fuel supply means for supplying fuel to said burner nozzle means so that a combustible mixture of the fuel and seeded oxidizing gas is formed in said nozzle means; combustion chamber means for receiving seeded plasma formed by combustion of the combustible mixture issuing from said burner nozzle means, said combustion chamber means being provided with an expansion nozzle in which the seeded plasma is expanded and directed at high speed to said magnetohydrodynamic generator.

References Cited

UNITED STATES PATENTS 1,937,552  12/1933  Davis.

DAVID X. SLINEY, *Primary Examiner.*